US008137180B2

(12) United States Patent
Thomas et al.

(10) Patent No.: US 8,137,180 B2
(45) Date of Patent: Mar. 20, 2012

(54) WAGERING GAME HAVING PROGRESSIVE AMOUNTS DISPLAYED IN A MATRIX

(75) Inventors: Alfred Thomas, Las Vegas, NV (US); Shridhar P. Joshi, Naperville, IL (US); Peter R. Anderson, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 775 days.

(21) Appl. No.: 11/632,917

(22) PCT Filed: Jul. 27, 2005

(86) PCT No.: PCT/US2005/026549
§ 371 (c)(1),
(2), (4) Date: Jul. 18, 2010

(87) PCT Pub. No.: WO2006/014990
PCT Pub. Date: Feb. 9, 2006

(65) Prior Publication Data

US 2011/0003636 A1 Jan. 6, 2011

Related U.S. Application Data

(60) Provisional application No. 60/591,713, filed on Jul. 28, 2004.

(51) Int. Cl.
*A63F 9/24* (2006.01)
*A63F 13/00* (2006.01)
*G06F 17/00* (2006.01)
*G06F 19/00* (2006.01)

(52) U.S. Cl. .............. 463/20; 273/138; 463/18; 463/19; 463/26; 463/27; 463/28; 463/40; 463/41; 463/42

(58) Field of Classification Search .................. 273/138; 463/18–20, 26–28, 40–42
See application file for complete search history.

(56) References Cited

U.S. PATENT DOCUMENTS 4,436,308 A * 3/1984 Rose et al. ...................... 463/31
4,624,459 A 11/1986 Kaufman ................. 273/143 R
(Continued)

FOREIGN PATENT DOCUMENTS

CA 2 334 546 8/2001
(Continued)

OTHER PUBLICATIONS

Article for "Easy Riches" by Sigma Game, Strictly Slots, 1 page (Aug. 2001).

(Continued)

*Primary Examiner* — David L Lewis
*Assistant Examiner* — Adetokunbo Torimiro
(74) *Attorney, Agent, or Firm* — Nixon Peabody LLP

(57) ABSTRACT

A method for playing a wagering game on a gaming terminal. The wagering game allows a player to be eligible to win a plurality of progressive jackpots. The plurality of progressive jackpots can be arranged in columns and rows of a matrix, or can be displayed with other characteristics for identification, such as color, shapes, or alpha-numeric characters. The method includes conducting a wagering game having a randomly selected outcome. The player can be awarded two progressive jackpots in response to the randomly selected outcome being a single multiple-jackpot winning outcome. Further, the progressive jackpots that are achieved can be identified by their associated characteristics, which are displayed to the player.

20 Claims, 17 Drawing Sheets

U.S. PATENT DOCUMENTS

| | | | | |
|---|---|---|---|---|
| 4,837,728 | A | 6/1989 | Barrie et al. | 364/412 |
| 4,842,278 | A * | 6/1989 | Markowicz | 463/18 |
| 4,861,041 | A | 8/1989 | Jones et al. | 273/292 |
| 4,948,134 | A | 8/1990 | Suttle et al. | 273/85 |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 463/12 |
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 CP |
| 5,393,057 | A * | 2/1995 | Marnell, II | 463/13 |
| 5,417,430 | A | 5/1995 | Breeding | 273/292 |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,577,959 | A | 11/1996 | Takemoto | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,830,063 | A * | 11/1998 | Byrne | 463/18 |
| 5,839,956 | A | 11/1998 | Takemoto | 463/25 |
| 5,848,932 | A | 12/1998 | Adams | 463/20 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 5,969,704 | A * | 10/1999 | Green et al. | 345/634 |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,241,608 | B1 | 6/2001 | Torango | 463/27 |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,533,273 | B2 * | 3/2003 | Cole et al. | 273/138.1 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,648,762 | B2 | 11/2003 | Walker et al. | 463/25 |
| 6,656,052 | B2 | 12/2003 | Abramopoulos et al. | 463/47 |
| 6,666,767 | B1 * | 12/2003 | Dayan | 463/17 |
| 6,676,513 | B2 | 1/2004 | Gauselmann | 463/20 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,887,154 | B1 | 5/2005 | Luciano, Jr. et al. | 463/26 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0109306 | A1 | 6/2003 | Karmarkar | 463/40 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228899 | A1 | 12/2003 | Evans | 463/25 |
| 2003/0236116 | A1 * | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0092304 | A1 | 5/2004 | George | 463/29 |
| 2005/0003880 | A1 | 1/2005 | Engleman | 463/16 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0096130 | A1 | 5/2005 | Mullins | 463/27 |
| 2005/0137010 | A1 | 6/2005 | Enzminger et al. | 463/25 |
| 2005/0192088 | A1 | 9/2005 | Hartman et al. | 463/27 |
| 2005/0215313 | A1 | 9/2005 | O'Halloran | 463/26 |
| 2006/0003829 | A1 | 1/2006 | Thomas | 463/20 |
| 2006/0019737 | A1 | 1/2006 | Yang | 463/19 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0073877 | A1 | 4/2006 | Rodgers et al. | 463/20 |
| 2006/0073889 | A1 | 4/2006 | Edidin et al. | 463/27 |
| 2006/0116201 | A1 | 6/2006 | Gausselmann | 463/26 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |

| | | | | |
|---|---|---|---|---|
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0281527 | A1 | 12/2006 | Dunaevsky et al. | 463/20 |
| 2006/0287077 | A1 | 12/2006 | Grav et al. | 463/27 |
| 2007/0026941 | A1 | 2/2007 | Block et al. | 463/29 |
| 2007/0054733 | A1 | 3/2007 | Baerlocher | 463/27 |
| 2007/0060244 | A1 | 3/2007 | Yaldoo et al. | 463/16 |
| 2007/0060271 | A1 | 3/2007 | Cregan et al. | 463/16 |
| 2007/0060314 | A1 | 3/2007 | Baerlocher et al. | 463/25 |
| 2007/0060319 | A1 | 3/2007 | Block et al. | 463/27 |
| 2007/0060365 | A1 | 3/2007 | Tien et al. | 463/42 |

FOREIGN PATENT DOCUMENTS

| | | | |
|---|---|---|---|
| DE | 195 15 983 | A1 | 11/1996 |
| DE | 196 24 321 | A1 | 1/1998 |
| EP | 0 521 599 | A1 | 1/1993 |
| GB | 2 153 572 | A | 8/1985 |
| GB | 2 181 589 | A | 4/1987 |
| GB | 2 242 300 | A | 9/1991 |
| GB | 2313792 | A | 10/1997 |
| GB | 2 333 880 | A | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |
| WO | WO 03/083789 | A1 | 10/2003 |

OTHER PUBLICATIONS

Article for “Millioniser” by Glenn Haussman, Strictly Slots, pp. 50-53 (Mar. 2004).

Product Sheet for “Big Games Safari,” IGT, 24 pages (2000).

“New ’97 Games,” International Gaming & Wagering Business, 24 pages (Mar. 1997).

International Search Report—PCT/US06/20979 dated Nov. 13, 2006 (2 pages).

* cited by examiner

WAGERING GAME HAVING PROGRESSIVE AMOUNTS DISPLAYED IN A MATRIX

RELATED APPLICATIONS

This application claims priority from PCT Application No. PCT/US 2005/026549 filed Jul. 27, 2005 which in turn claims priority from U.S. Provisional Application No. 60/591,713 filed Jul. 28, 2004. Both of these applications are hereby incorporated by reference in their entirety.

FIELD OF THE INVENTION

The present invention relates generally to gaming terminals and, more particularly, to a gaming terminal having a matrix of progressive jackpots.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In current wagering games, the player can only win one progressive jackpot at a time, and there are only three or four progressive jackpots that are offered. This can cause player frustration should the player win the smallest progressive jackpot, because the player realizes that the odds of winning another progressive jackpot may be low.

Thus, there is a need to allow a player to win multiple progressive jackpots and also to provide more progressive jackpots in a different format. By offering more progressive jackpots, the player will feel as though he or she is likely to win a jackpot more frequently. Also, by allowing a player to win more than one progressive jackpot at a time, players will be more excited about the game and be more likely to play.

SUMMARY OF THE INVENTION

The present invention satisfies the needs mentioned above by allowing the player to have a greater chance of winning a progressive jackpot by offering more progressive jackpots. Also, by offering the progressive jackpots in a different format, such as a matrix, the wagering game generates more excitement.

In accordance with one embodiment of the present invention, there is provided a novel method for playing the wagering game, comprising providing a gaming terminal for playing the wagering game that allows a player to be eligible for a plurality of progressive jackpots. Each of the plurality of progressive jackpots is associated with at least two characteristics, such as a row characteristic and a column characteristic in a matrix, which displays the plurality of progressive jackpots. The method includes determining whether one or more of the plurality of progressive jackpots has been achieved by the player, and indicating the achieved progressive jackpots with the characteristics associated with the achieved progressive jackpots.

In another aspect, the wagering game includes a plurality of symbols that indicate a randomly selected outcome of the wagering game. The randomly selected outcome includes a plurality of progressive jackpot winning outcomes. The wagering game also includes a plurality of progressive jackpots arranged in a matrix, and at least two jackpots can be won based on a single event in the wagering game.

In another alternative, the gaming system comprises at least one gaming terminal for playing a wagering game that allows a player to be eligible for a plurality of progressive jackpots. The wagering game has a randomly selected outcome selected from a plurality of outcomes. The gaming system further includes a controller coupled to the one gaming terminal and operative to award at least two of the plurality of progressive jackpots in response to a single event in the wagering game.

In another embodiment of the present invention, there is provided a gaming terminal. The gaming terminal includes a wagering game having a plurality of symbols that indicate a randomly selected outcome of the wagering game. The randomly selected outcome includes at least one single progressive winning outcome and at least one multiple-progressive winning outcome. In response to the randomly selected outcome being the at least one single progressive winning outcome, the gaming terminal awards the player one of the plurality of progressive jackpots. In response to the randomly selected outcome being the at least one multiple-progressive winning outcome, the gaming terminal awards the player at least two of the plurality of progressive jackpots.

In yet another embodiment of the present invention, there is provided a gaming system. The gaming system includes at least one display and at least one gaming terminal for playing a basic game. The gaming terminal has a plurality of progressive jackpots and a plurality of color-coded progressive winning outcomes. Each of the plurality of color-coded progressive winning outcomes corresponds to at least one of the plurality of progressive jackpots. The gaming system also includes a controller that is coupled to both the gaming terminal and the display. The controller is operative to award the corresponding progressive jackpot in response to of the plurality of color-coded progressive jackpot winning outcomes being achieved.

In still another embodiment of the present invention, a gaming terminal is provided that includes a wagering game having a plurality of symbols that indicate a randomly selected outcome of the wagering game. The gaming terminal also includes a plurality of progressive jackpots. Each of the progressive jackpots corresponds to a symbol of the wagering game. In response to the symbol corresponding to one of the plurality of progressive winning jackpots crossing a payline of the wagering game, the gaming terminal highlights the corresponding one of the progressive jackpots that is displayed on the gaming terminal.

And, in yet another embodiment of the present invention, a gaming terminal including a wagering game is provided. The wagering game includes a randomly selected outcome and allows the player to be eligible for a plurality of progressive jackpots. In response to the achieving a progressive winning outcome, the gaming terminal provides the player with the option of obtaining one progressive jackpot, or declining that jackpot and being randomly awarded another one of the progressive jackpots.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
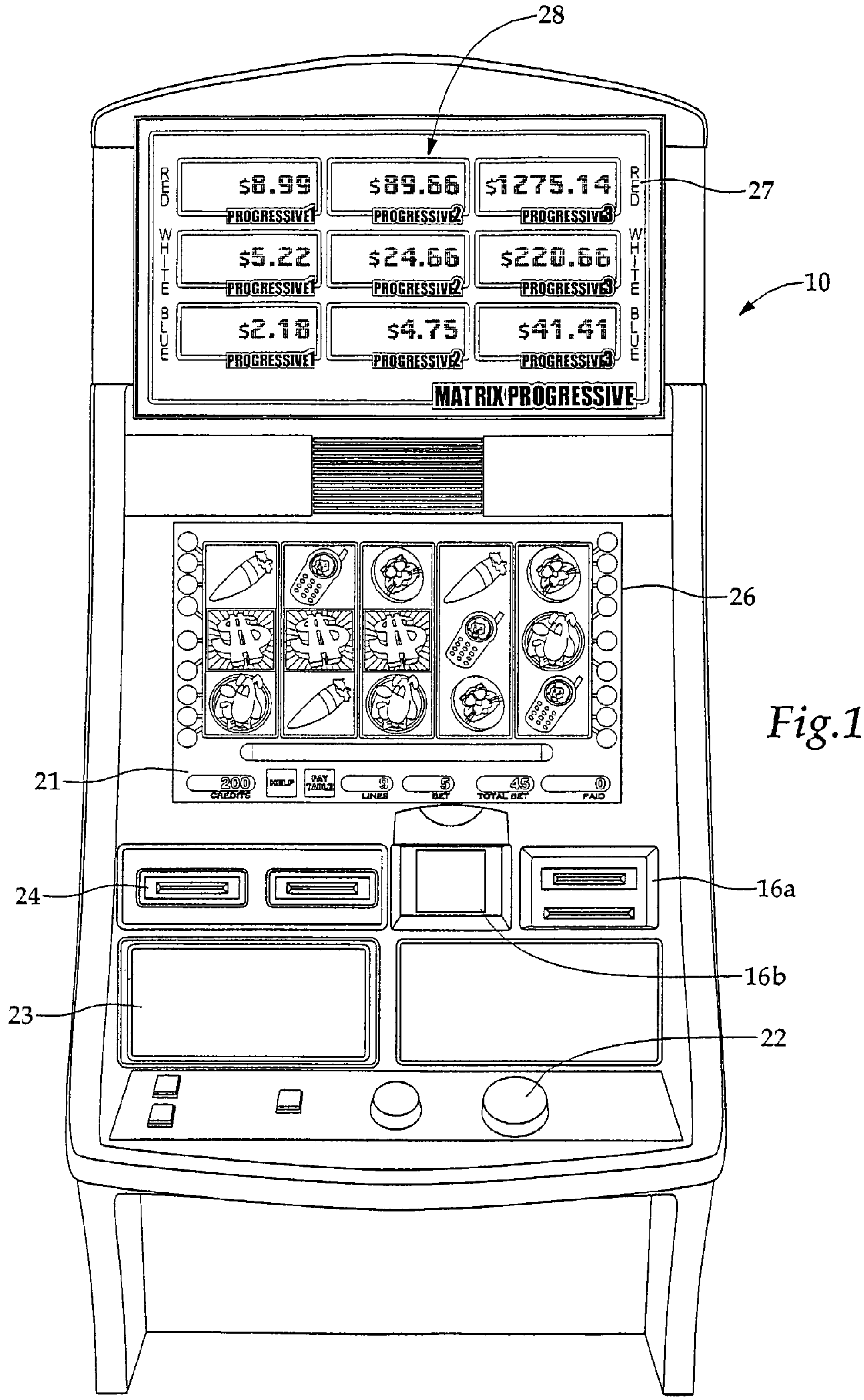
FIG. 1 is a perspective view of a video gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor 16*a* and a cash wager accepter 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, and/or also possibly game-related information or other entertainment features. In this embodiment, the secondary display 27 displays a progressive matrix 28 (or array). While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as well.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
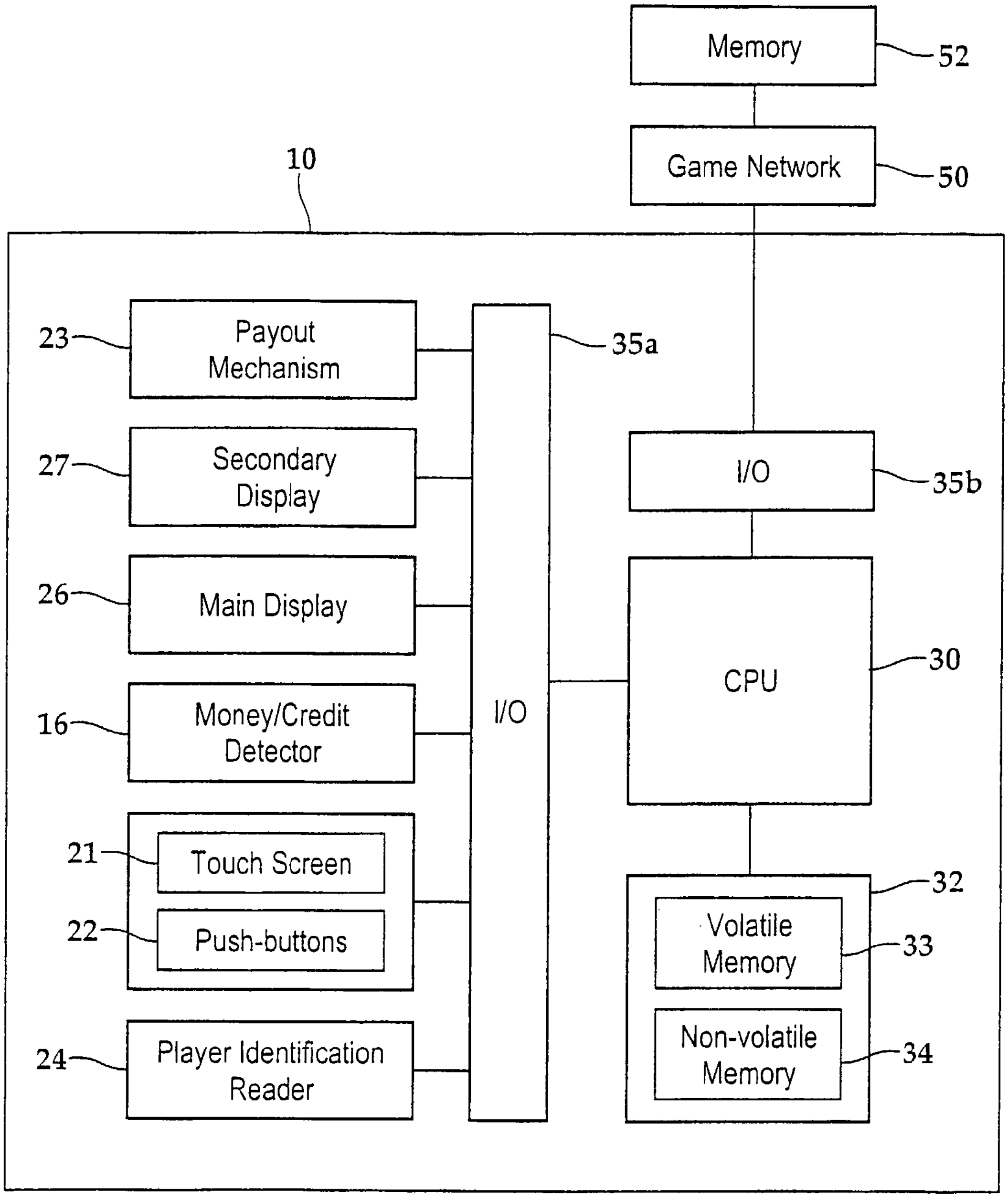
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

In some embodiments, the CPU 30 may not be inside the gaming terminal 10. Instead, the CPU 30 may be part of a game network 50 and may be used to control numerous gaming terminals 10. The game network 50 typically has its own memory 52 for assisting with the various functions that it performs. One gaming network that is particularly useful with the present invention is the one described in "Restricted Access Progressive Game For A Gaming Machine," Ser. No. 60/502,762, filed Sep. 12, 2003, which is hereby incorporated by reference in its entirety. In these embodiments, the CPU 30 will run the basic games for each of the gaming terminals 10, and may also be used to link the gaming terminals 10 together. The game network 50 can include progressive jackpots that are contributed to by all or some of the gaming terminals 10 in the network (e.g., terminal-level jackpots that only each terminal 10 contributes to, bank-level jackpots that are contributed to by all of the terminals 10 in a particular bank, and wide-area jackpots that are contributed to by a larger number of terminals 10, such as multiple banks).

Figure 3:
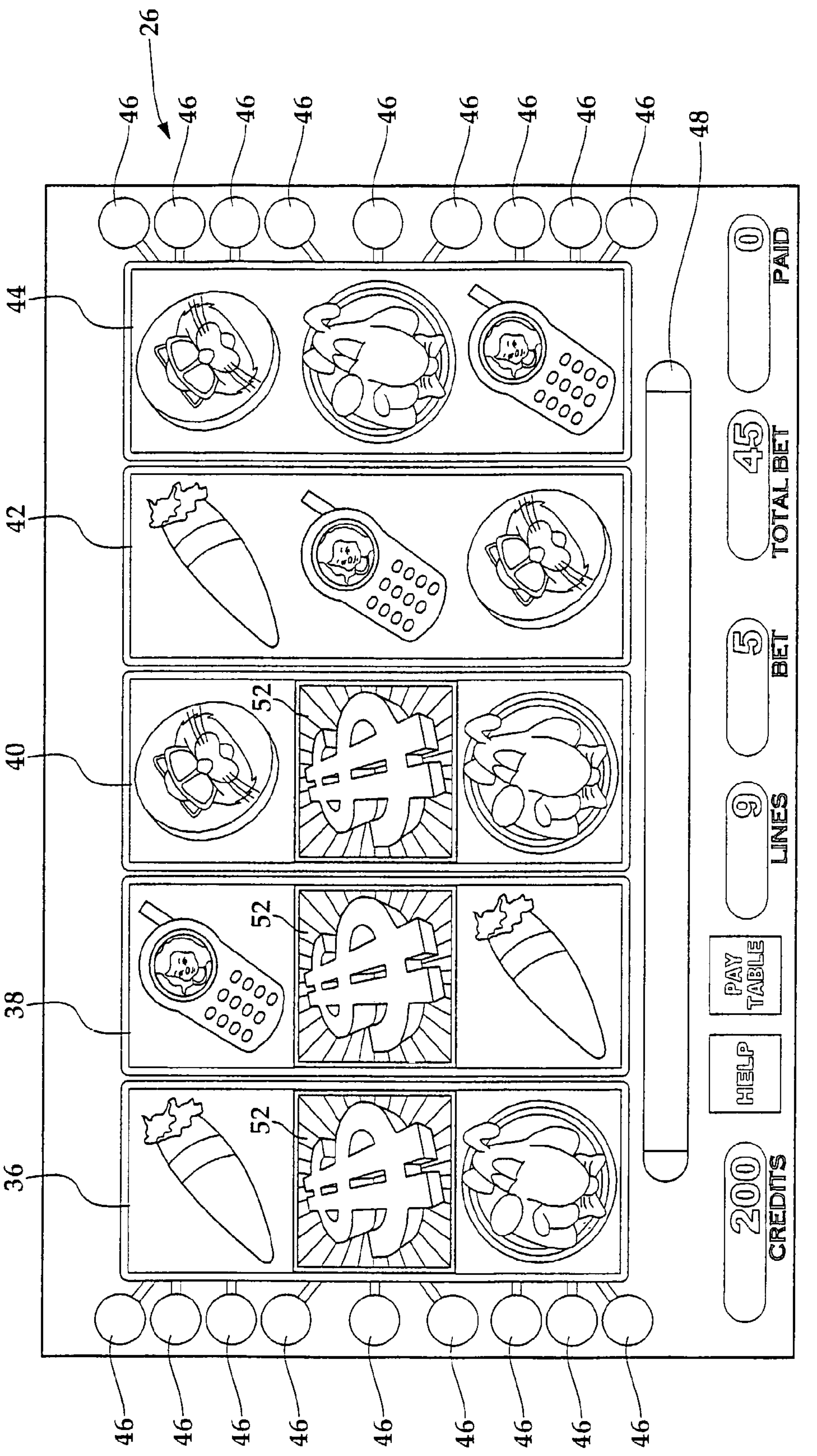
FIG. 3 illustrates a display of a basic game on the gaming terminal of FIG. 1.

Turning now to FIG. 3, the main display 26 of one embodiment of the present invention is shown in more detail. In this embodiment, the basic wagering game is a slot machine game, with symbols on five different reels 36, 38, 40, 42, 44. The reels 36-44 may be either traditional mechanical reels or they may be computer-generated images of reels, with each reel composed of a plurality of symbols. The payline indicators 46 indicate a randomly selected outcome for each payline, which is the combination of symbols on the reels 36-44. Thereafter, an outcome indicator 48 indicates whether the outcome has resulted in a winning outcome or a non-winning outcome. In the present example, various combinations of the symbols can result in winning outcomes, which include monetary and non-monetary prizes. The non-monetary prizes can include free spins, multipliers, and entry into an advanced game such as bonus game or a progressive game. While multiple paylines are shown, a gaming terminal 10 with a single payline will also work with the present invention.

In this particular embodiment, a particular group of symbols 52 is one of a plurality of progressive jackpot outcomes. In this embodiment, a combination of three dollar signs along any payline being played generates the progressive jackpot outcome. In other embodiments, all award-winning combinations generate the progressive jackpot outcome 52 or a single particular symbol may generate the progressive jackpot outcome 52.

The progressive jackpot outcome 52 corresponds to a certain jackpot in the progressive jackpot matrix (or array) 28 illustrated on the secondary display 27 as shown in FIGS. 1 and 4-7. Each of the FIGS. 4-7 will now be described in more detail. Generally speaking, in each of the figures, the progressive jackpot matrix 28 includes nine different progressive jackpots. The columns in the matrix 28 are indicated by progressive numbers (e.g., progressive 1, progressive 2, progressive 3) and the rows are indicated by colors (e.g., red, white and blue). While the value of the jackpots can be arranged in various orders, as shown, the progressive 3 column has the largest jackpots, while the progressive 1 column has the smallest jackpots. Further, the red row (i.e., the top row) has the highest value.

Figure 4:
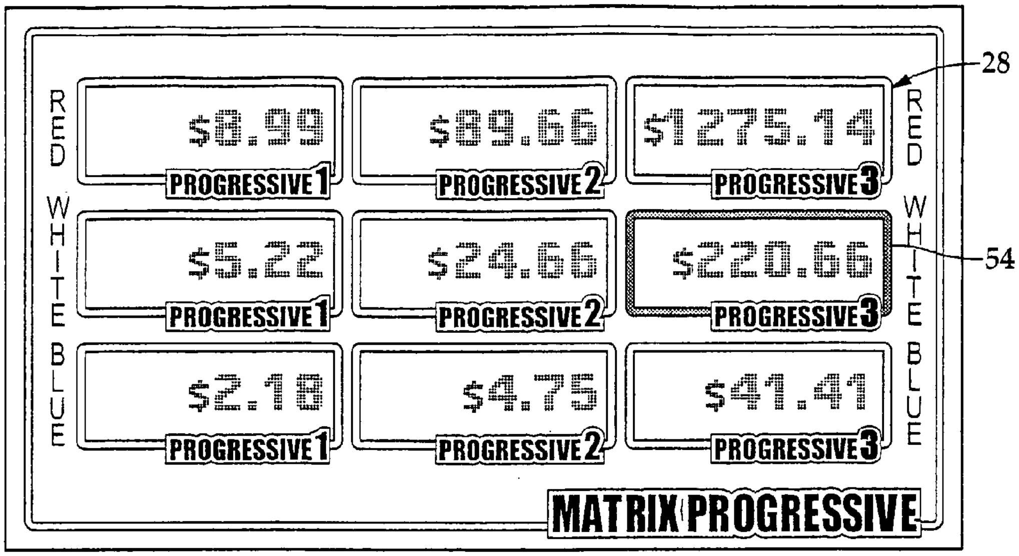
FIG. 4 illustrates one embodiment of a progressive jackpot screen on the gaming terminal of FIG. 1.

During the course of the basic game, when the player achieves one of the plurality of progressive jackpot outcomes 52, like the three dollar signs shown in FIG. 3, the secondary display 27, lights up the corresponding progressive jackpots of the matrix 28 that have been won. Depending on the symbol combination, the player may win a single progressive jackpot 54 as shown in FIG. 4. In that embodiment, the progressive award outcome 52 generated would only correspond to "white progressive 3" 54.

Figure 5:
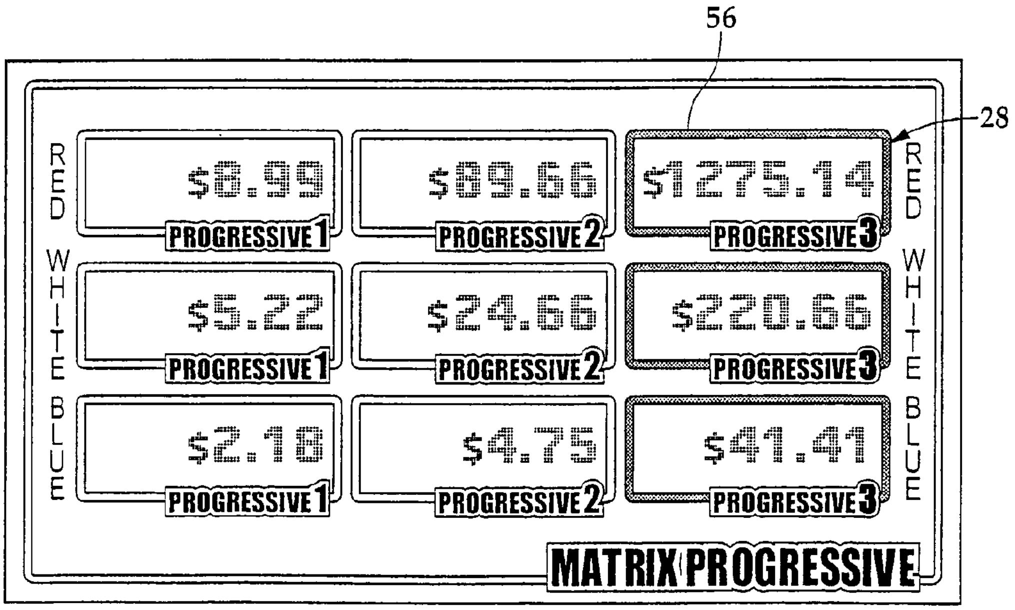
FIG. 5 illustrates another embodiment of a progressive jackpot screen on the gaming terminal of FIG. 1.

However, the player may also win an entire row or column as shown in FIG. 5. In that embodiment, the symbol combination in the basic game corresponds to all of "progressive 3"column 56. A player may also win an entire row, if the symbol combination were to correspond to "all red" or all of any other demarcation for row or column. Yet further, the progressive jackpot outcome is a win-all outcome that allows the player to win all nine of the progressives, or the entire progressive matrix 28.

Figure 6:
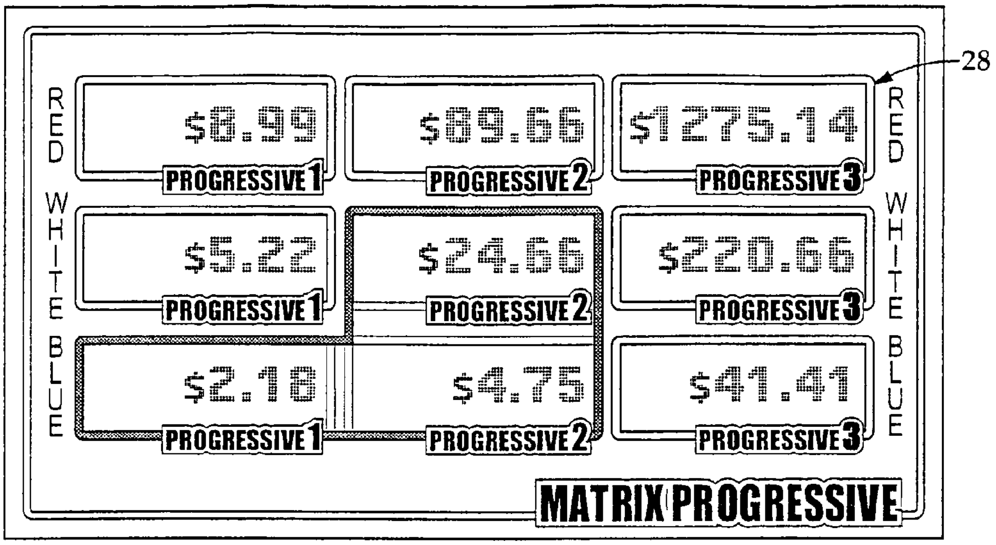
FIG. 6 illustrates still another embodiment of a progressive jackpot screen on the gaming terminal of FIG. 1.

In the embodiment illustrated in FIG. 6, the player has been awarded three of the progressive jackpots that are defined by the highlighted border. As an example, one basic game symbol may dictate the blue progressive 2 jackpot ($4.75) has been achieved, while one or two other symbols indicate that the player also wins jackpots adjacent to any indicated progressive jackpot. Thus, these other one or two "win-adjacent" jackpot symbols cause the highlighted border to be drawn larger to surround more progressive jackpots, which in FIG. 6 includes jackpots of $2.18 and $24.66. In other embodiments, the progressive jackpots awarded may correspond to predetermined shapes on the matrix 28, such as a diagonal, diamond, a rectangle, or a triangle.

Figure 7:
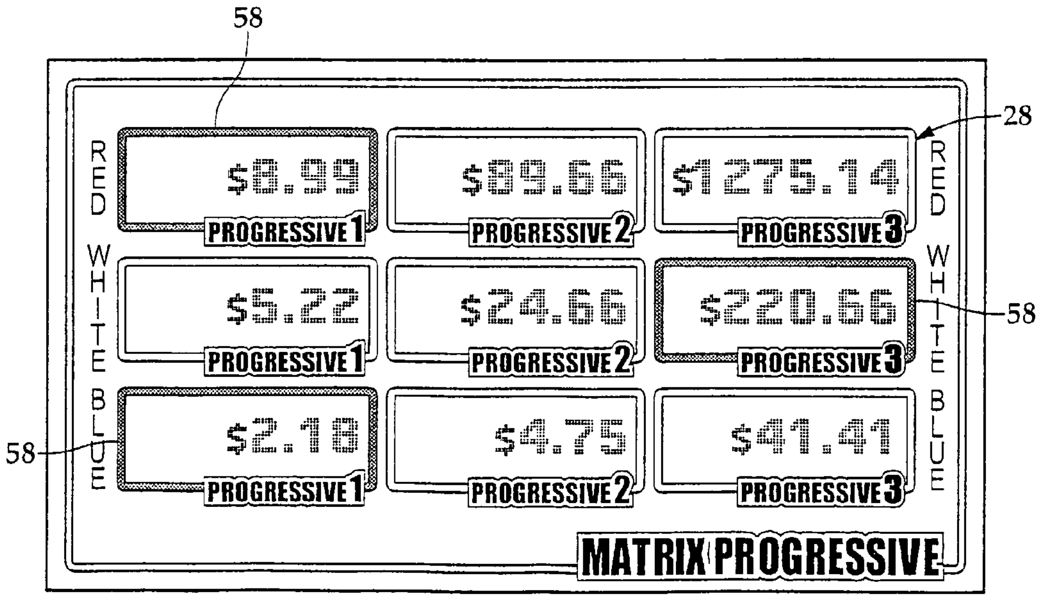
FIG. 7 illustrates yet another embodiment of a progressive jackpot screen on the gaming terminal of FIG. 1.

In other embodiments, such as the one shown in FIG. 7, the progressive jackpots won by a particular combination may not be a part of a row or column, but may be three random progressive jackpots 58 chosen by the CPU 30 or other processor in the game network 50 (FIG. 2).

In the embodiments shown in FIGS. 5-7, there is a chance to win multiple progressive jackpots at once. This is appealing to a player because it allows the player to win more progressives at one time, so that even if the player wins the smaller progressive jackpot, the player may win it in combination with other larger jackpots, yielding a more beneficial result.

In other embodiments, the progressive jackpots in the matrix may, be color-coded. As show in FIGS. 1-7, the colors correspond to specific rows (e.g., the progressive jackpots in the first row are red, second row are white, third row are blue). Alternatively, the color-coding of the progressive jackpots may be completely random and may also alternate while the reel is spinning. By allowing the color-coding to change while the reel is spinning, there is added player excitement because the number and amount of the progressive jackpots that the player can win is constantly changing.

Figure 8:
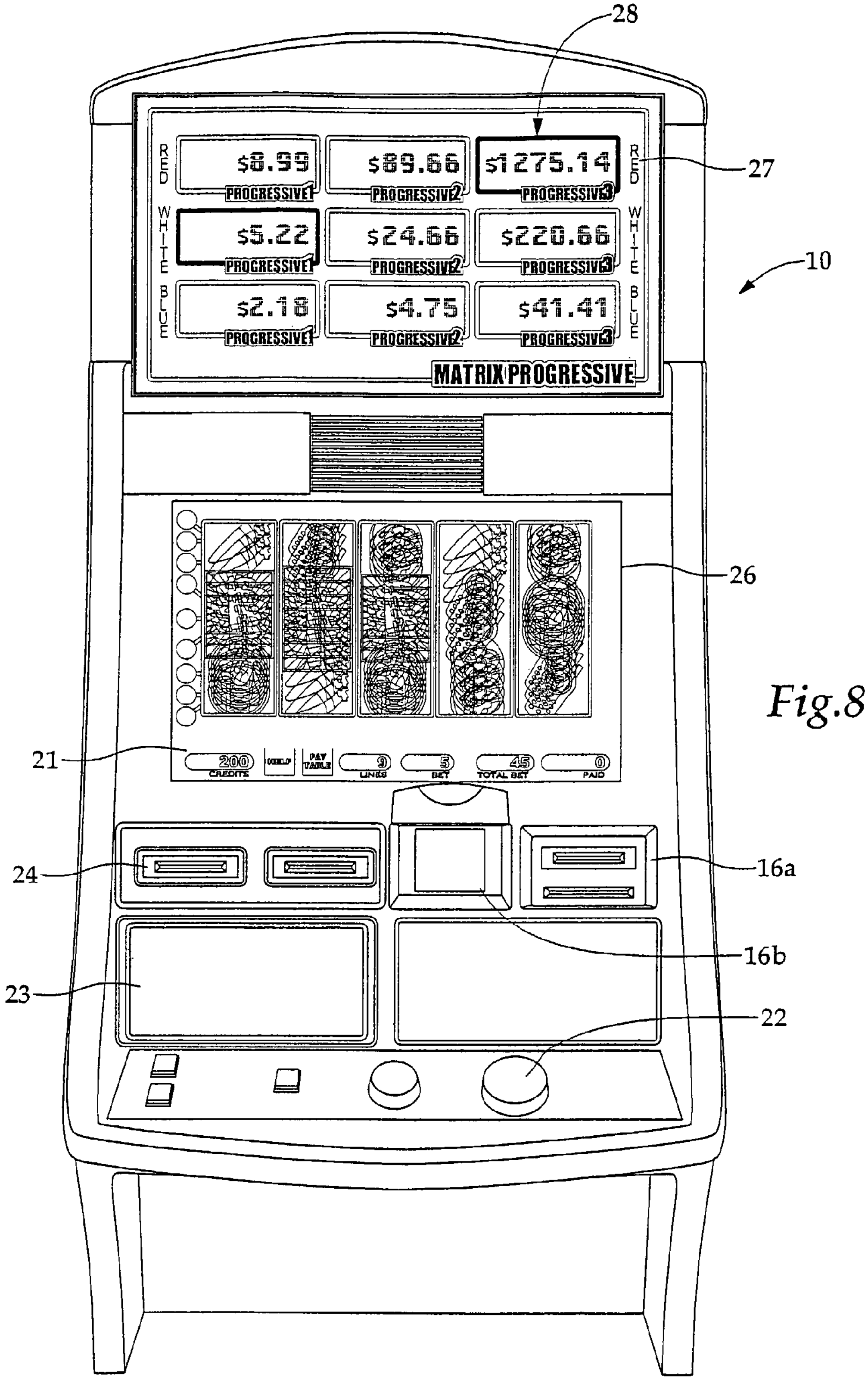
FIG. 8 is a perspective view of another video gaming terminal according to one embodiment of the present invention.

Turning now to FIG. 8, another embodiment of the present invention will be described relative to the gaming terminal 10. In this embodiment, as the reels on the main display 26 are spinning, the secondary display 27 highlights any of the individual progressives of the progressive matrix 28 as the symbol combinations that result in that progressive being awarded pass by the payline 46. For example, as shown in FIG. 8, if the reels were stopped at its current position, the player would be awarded two of the progressive jackpots (i.e., two dollar signs are aligned along the payline 46 in the first and third reels). The progressive jackpots may be lit up by light cups (not shown) that are placed behind the secondary display 27 or any other conventional lighting method. The secondary display 27 (e.g. LCD, plasma) that displays the jackpot matrix 28 can also be engaged in various ways to provide the desired highlighting. This generates player excitement because the players can watch which of the progressives they may potentially win.

Figure 9:
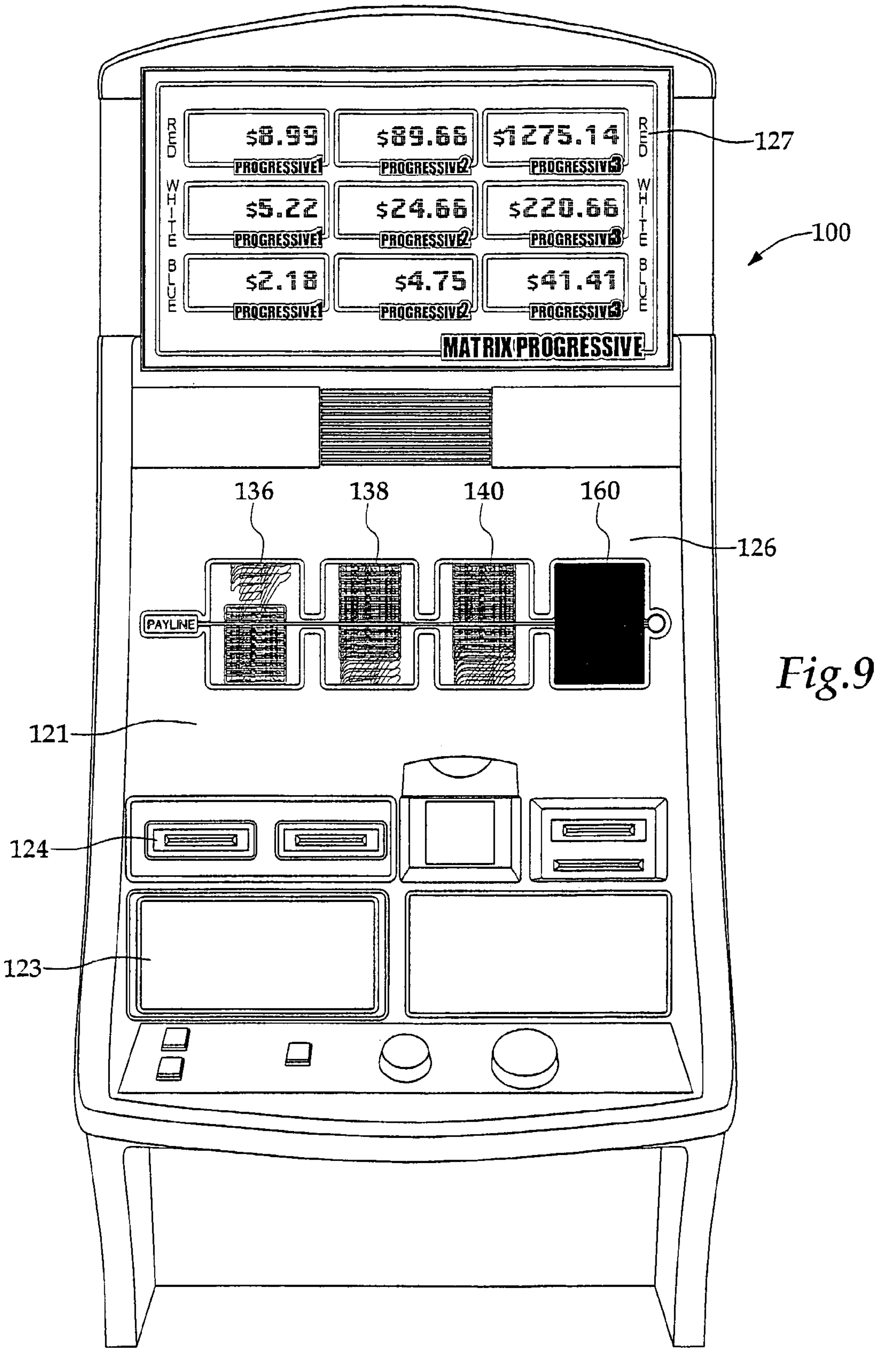
FIG. 9 is a perspective view of another video gaming terminal according to one embodiment of the present invention.
Figure 10:
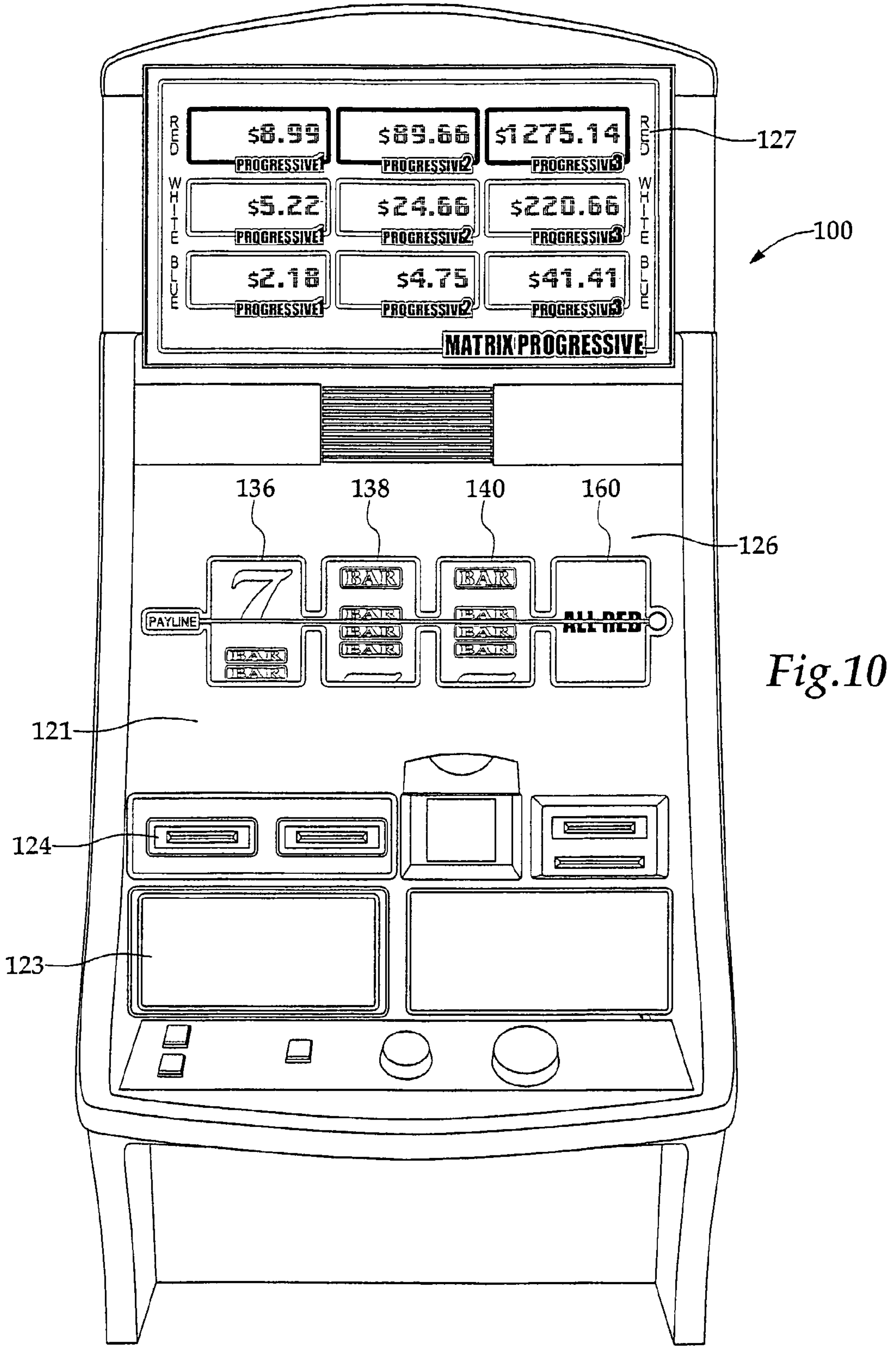
FIG. 10 is perspective view of the gaming terminal of FIG. 9 when the progressive jackpots along the "red" row have been achieved.

Turning now to FIGS. 9-10, another embodiment of a gaming terminal 110 is shown, which has features like the gaming terminal 10 of FIGS. 1-8, except they are shown in 100-series numbers. In this embodiment, rather than the symbols in the basic game indicating which one or more of the progressive jackpots have been achieved, a separate device is used to indicate which jackpots have been won. As in the previous embodiments, the gaming terminal 110 includes a main display 126, and a secondary display 127. In this embodiment, the main display 126 includes three mechanical reels 136, 138, 140 (although it may also be any number of video reels or mechanical reels) that each have a plurality of symbols and operate the basic game as described above. In addition to the three mechanical reels, there is a fourth reel 160. The fourth reel 160 is a progressive jackpot reel and remains dark (e.g., via black glass) while the three mechanical reels 136, 138, 140 spin during the basic game.

As shown in FIG. 10, when the three basic game reels 136, 138, 140 stop spinning, if the symbols on those reels result in a progressive jackpot win, the fourth reel 160 is then revealed and spins. The spinning of the fourth reel 160 may result in corresponding jackpots being highlighted on the display 127 as they cross the payline of the fourth reel 160. The fourth reel 160 stops on a symbol that indicates the result of a randomly selected progressive game outcome. Here, the player has won the "ALL RED" row, and the red row is highlighted in FIG. 10. The fourth reel 160 can be thought of as its own reel set that indicates characteristics of a certain group of progressive jackpots that are then awarded to the player. While one reel 160 is shown in reel set of FIGS. 9 and 10, a plurality of reels are possible as well, with each reel indicating one characteristic about which jackpot has been won. For example, there could be two reels with one indicating the row characteristic and the other reel indicating the column characteristic.

In another embodiment, the fourth reel 160 may not remain dark and the progressive jackpot amounts may be highlighted as the basic game reels 136, 138, 140 spin. This would allow the player to see what types of winnings there are and how close the player has come to winning one of them.

Again, in the embodiment of FIGS. 9-10, rather than the symbols in the basic game indicating which one or more of the progressive jackpots have been achieved, a separate device (the reel 160) is used to indicate which jackpots have been won. In a further alternative, an array of player-selectable elements hiding the progressive jackpot characteristics, which dictate outcomes, can be provided to the player, who selects one or more elements form the array. For example, the player may select one that reveals a "no-progressive jackpot" outcome or one that reveals an "award blue row" outcome.

Figure 11:
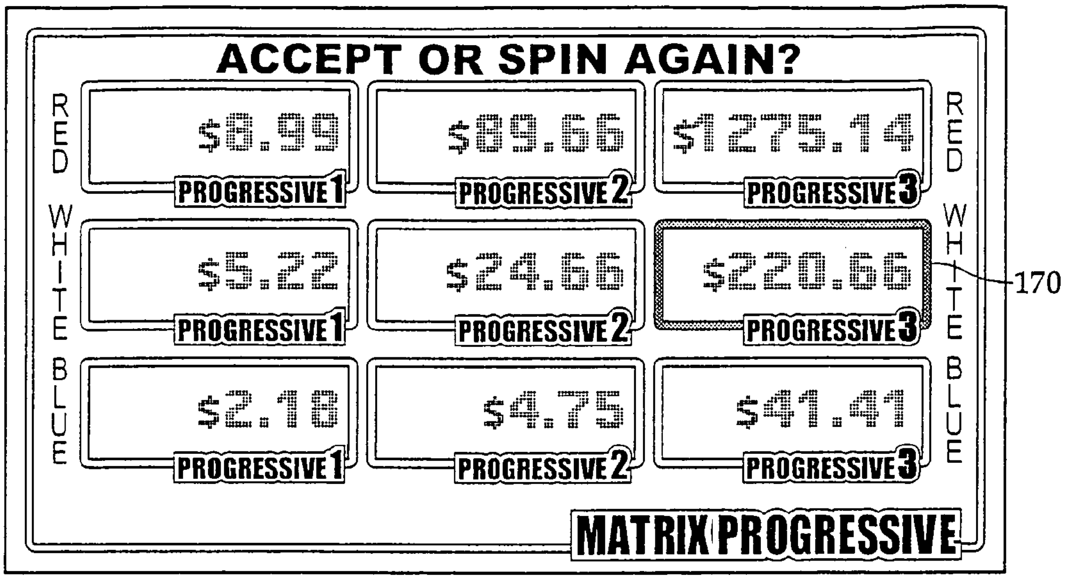
FIG. 11 illustrates a progressive jackpot screen according to another embodiment of the present invention.
Figure 12:
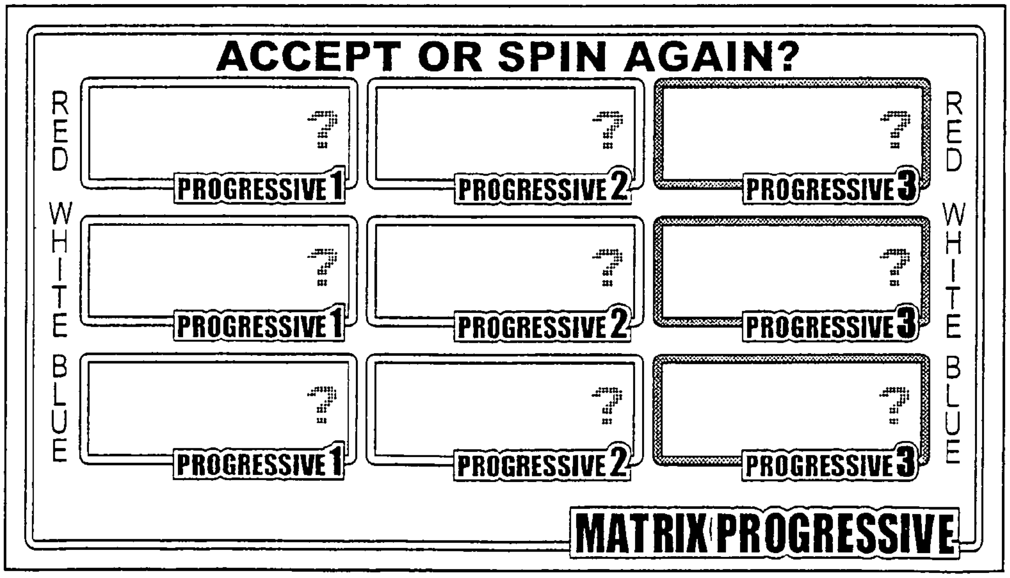
FIG. 12 illustrates a progressive jackpot screen according to yet another embodiment of the present invention.

Turning now to FIGS. 11 and 12, other embodiments of the present invention are shown. In the embodiment shown in FIG. 11, the player is given the option whether to accept the progressive jackpot 170 that has been awarded, here illustrated as white progressive 3 ($220.66), or to allow another random selection of progressive jackpots to try for a higher progressive award amount (e.g., another spin of reel 160 in FIGS. 9-10). In this embodiment, if a player has been awarded the lowest dollar amount and is dissatisfied, the player may spin again to try for a higher progressive amount, while forgoing the first awarded jackpot. This decreases player dissatisfaction with the game. The "spin again" option may cost the player credits or the gaming terminal may be designed to allow the player a certain number of times to spin again for free. Alternatively, the player may be required to obtain a "scatter" spin-again symbol in the basic game that allows for this option. While the example has been described whereby the player rejects a progressive jackpot for another one, the player could also trade the progressive jackpot for some other asset (e.g., a multiplier for the next basic game, a free spin, etc) as long as the expected value of the traded asset is approximately the same.

The embodiment in FIG. 12 utilizes the same concept, but in this embodiment, the player is not aware of the amount of the jackpot won. The player instead takes a chance that the progressive amount that has been won is lower than what could be won. In the illustrated embodiment, the player has won all of the progressive 3 row, which would be a beneficial outcome that would typically leave the player satisfied. However, if the player has only won a single progressive jackpot, then he or she may want to play again to try to achieve multiple progressive jackpots. Players may like this option because it gives the player a chance to win more progressives.

The embodiment described in FIG. 12, with the progressive amounts being hidden, may also be used in any of the other embodiments described above as well. Hiding the amount of the progressive jackpot adds an element of surprise to the game that is appealing to game players.

Figure 13:
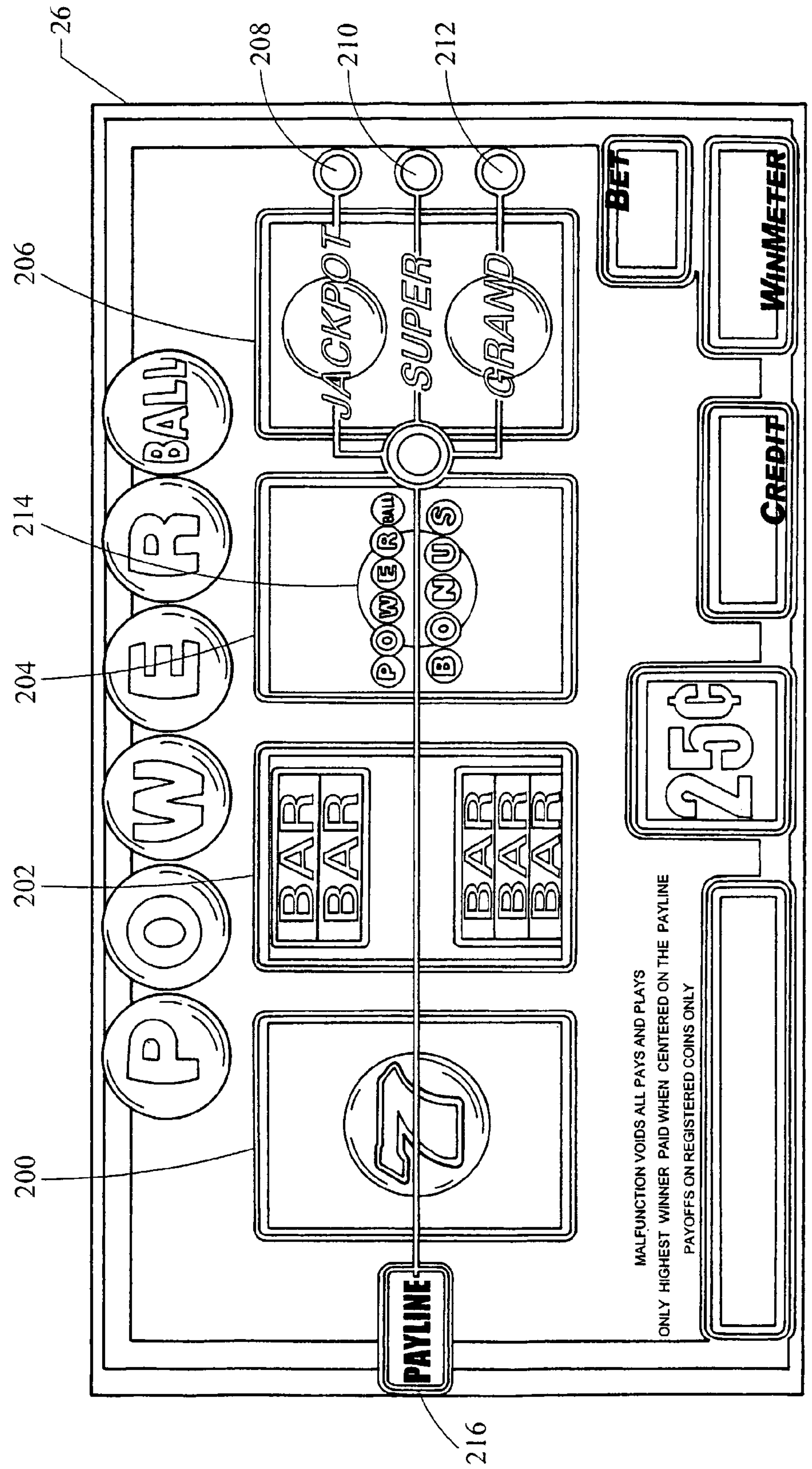
FIG. 13 illustrates a display of a basic game according to one embodiment of the present invention.

Turning now to FIG. 13, another embodiment of the main display 26 (or 126 from FIG. 9 above) is illustrated. In this embodiment, the basic wagering game is a slot machine game, with symbols on three mechanical reels 200, 202, 204 (although it may be any number of mechanical or video reels). A fourth reel 206 is a progressive jackpot reel and includes three pay lines 208, 210, 212. In this embodiment, one payline 208 is labeled "jackpot;" the second payline 210 is labeled "super;" and the third payline 212 is labeled "grand." In other embodiments, there may be a different number of pay lines and/or different labels.

Figure 14:
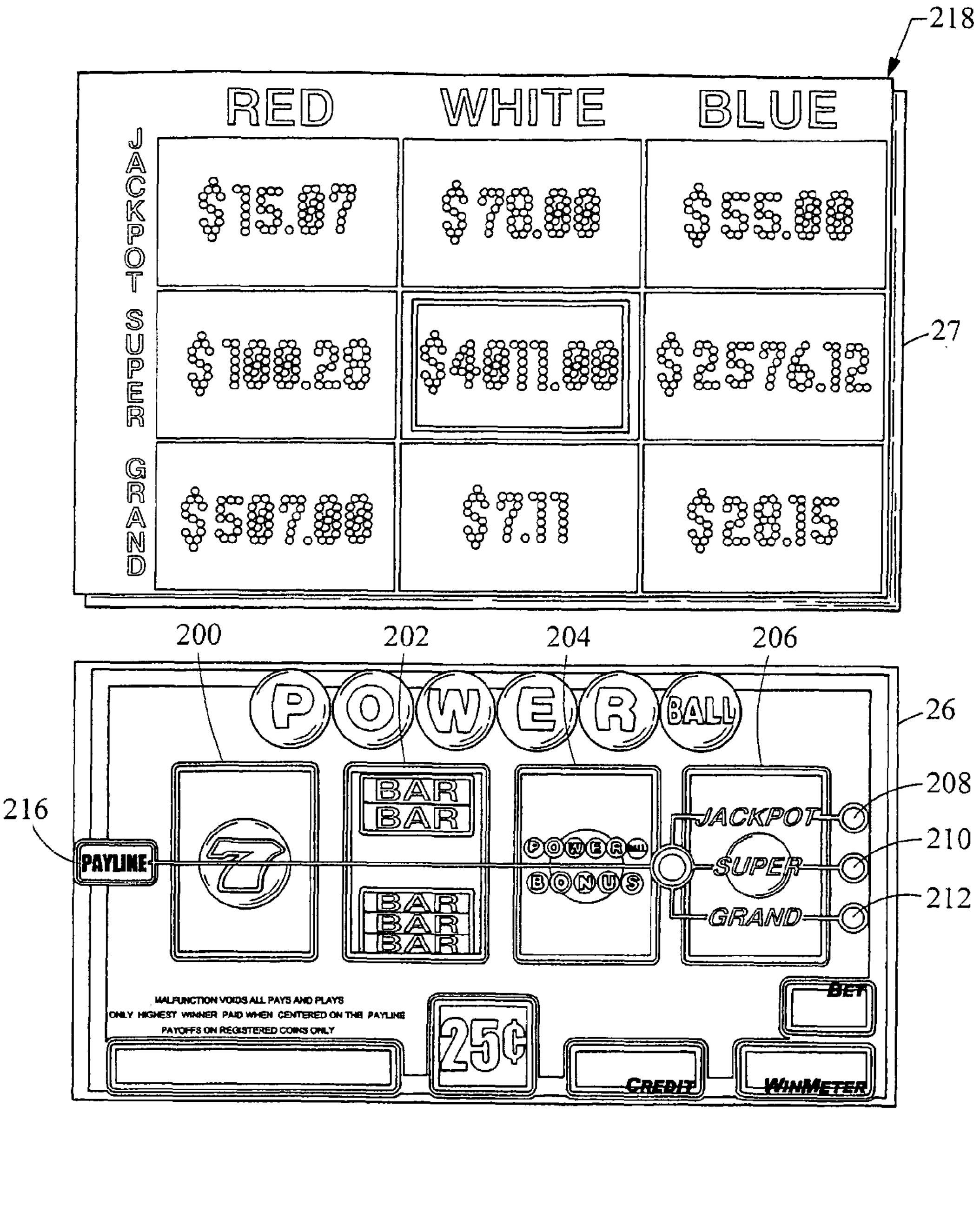
FIG. 14 illustrates a display of a basic game of FIG. 13 and a progressive screen according to one embodiment of the present invention.

When the three basic game reels 200, 202, 204 stop spinning, if a "powerball bonus" symbol 214 is located on a payline 216, then the fourth reel 206 spins. As shown in FIG. 14, the fourth reel 206 stops spinning, and one ball (or other symbol) is located on at least one of the three pay lines 208, 210, 212. In FIG. 14, a white ball is on the "super" payline 210. The white ball on the "super" payline 210 corresponds to a progressive jackpot in the secondary display 27 (or 127). The secondary display 27 (or 127) illustrates a progressive jackpot matrix 218 (or array) that includes nine different progressive jackpots. The rows in the matrix 218 are labeled to correspond to the pay lines 208, 210, 212, which in this case are: "jackpot;" "super;" and "grand." The columns are labeled to correspond to the different colors of balls, which in this case are red, white, and blue. When a colored ball is located on one of the pay lines 208, 210, 212, the player is awarded the progressive jackpot that corresponds to the payline and the color of the ball. In the illustrated example, the player is awarded $4,011.00, which is the jackpot that corresponds to the white ball on the "super" payline.

Figure 15:
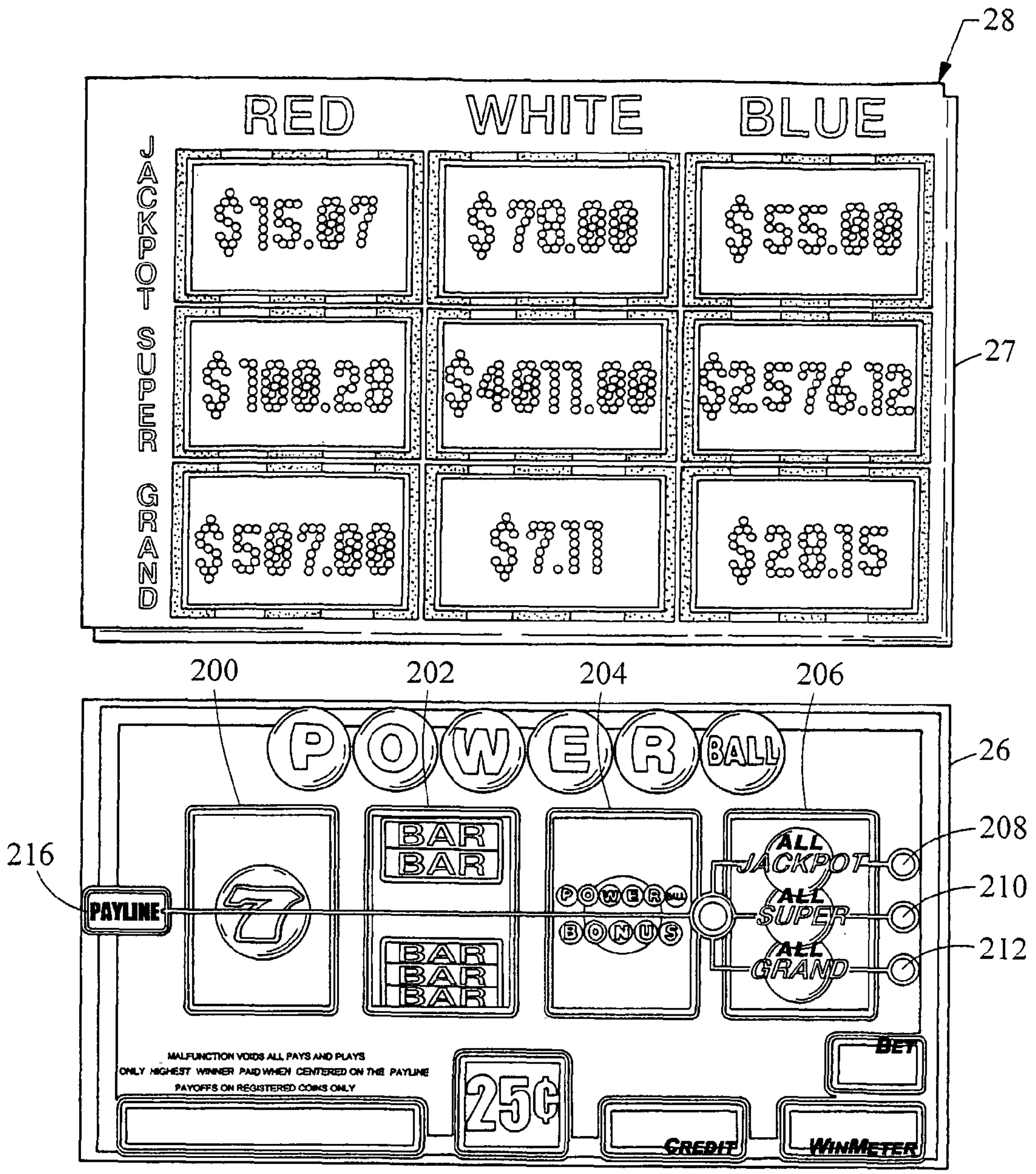
FIG. 15 illustrates a display of the basic game of FIG. 13 and a progressive screen according to another embodiment of the present invention.

As shown in FIG. 15, it is possible for the player to win more than one progressive jackpot. In this embodiment, an "all" ball (representing all three colors) has landed on each of the three pay lines 208, 210, 212. As shown, the player is awarded all of the progressive jackpots. In other embodiments, the player may achieve an "all" ball on only one or two of the pay lines 208, 210, 212, resulting in that player receiving an entire row (or two) of jackpots. In other embodiments, a single white (or blue or red) colored ball may land on each of the three pay lines 208, 210, 212, resulting in player winning an entire column of jackpots. Alternatively, any combination of number and/or color of balls may appear on any number of the pay lines 208, 210, 212, resulting in a wide variety of different payouts.

In some embodiments, as the fourth reel 206 is spinning, the reel symbols go past the three pay lines 208, 210, 212. During the spinning, the jackpot awards in the matrix 28 flash in synchronicity to the individual symbols on the fourth reel 206 as they pass the pay lines 208, 210, 212. As the fourth reel 206 slows down, the symbols on the pay lines cause the corresponding jackpots in the matrix 28 to light up. For example, as each ball crosses a payline, the corresponding jackpot would be lit. This creates excitement for the player who can see which (and how many) progressives the player could win.

The dollar amounts listed in the progressive matrix 28 may be illustrated using a color dotmation stencil/template over an LCD, a traditional dot matrix display, or an LCD (including low-resolution LCD).

Figure 16:
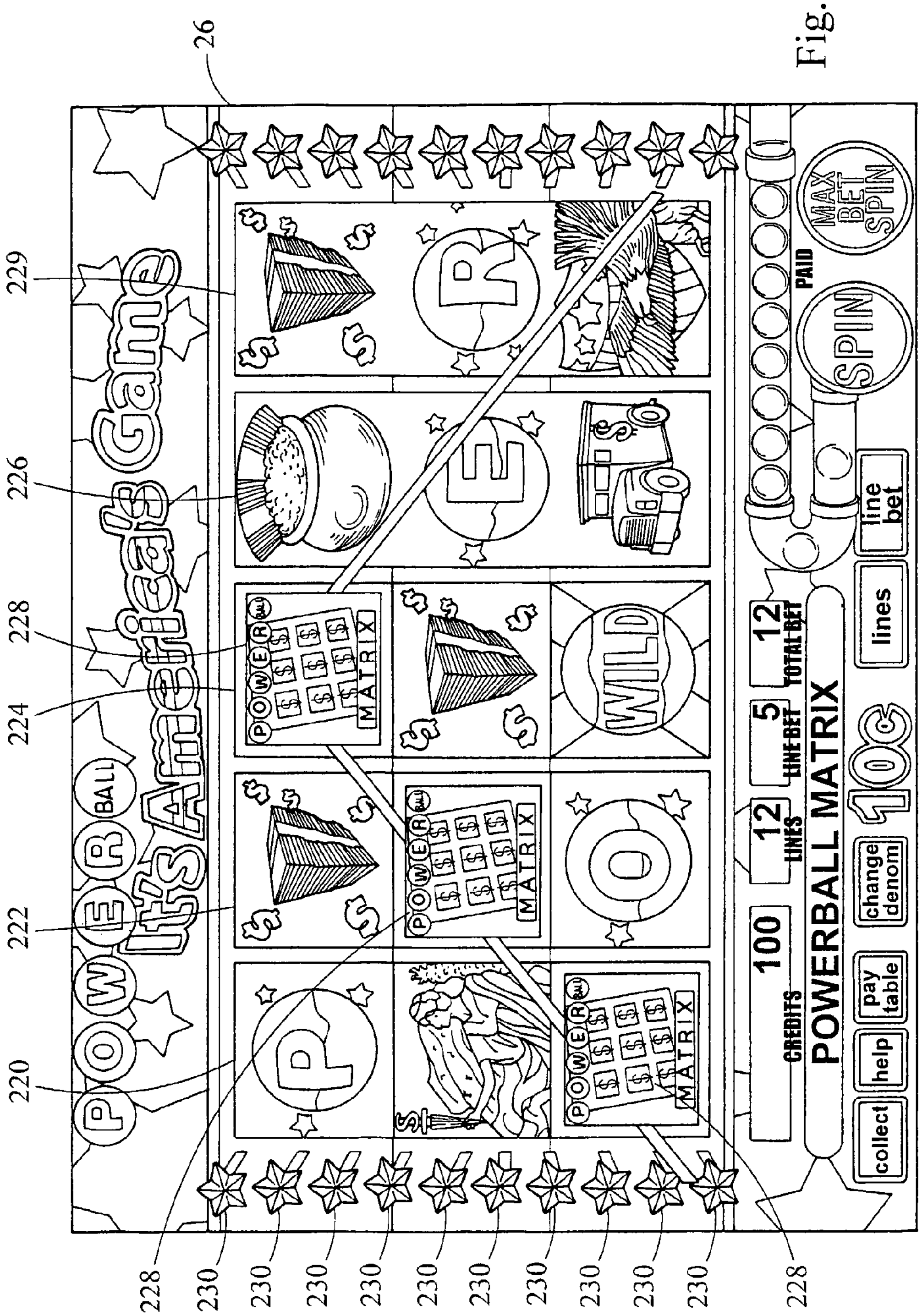
FIG. 16 illustrates a display of a basic game according to another embodiment of the present invention.
Figure 17:
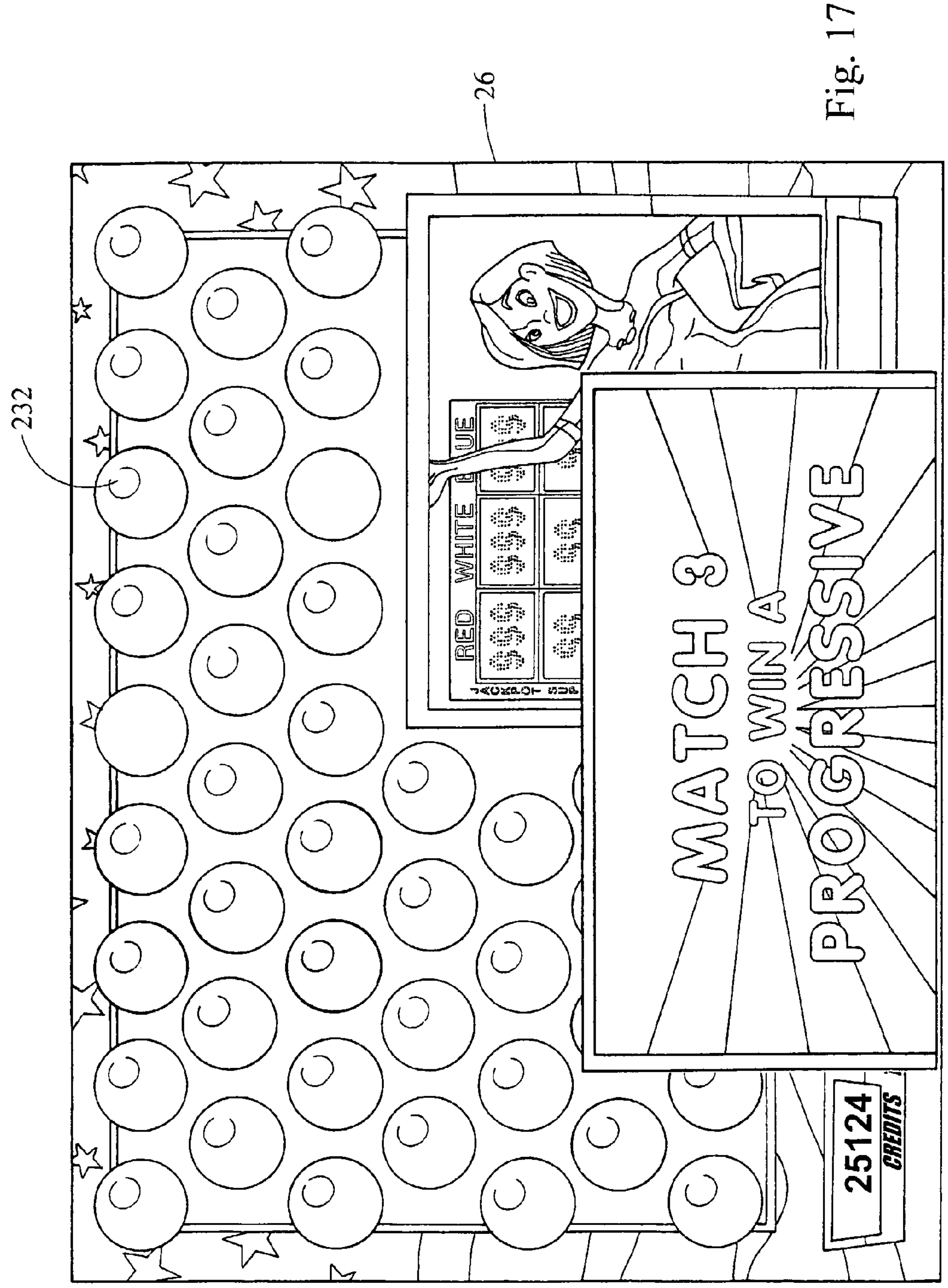
FIG. 17 illustrates a display of a progressive game according to one embodiment of the present invention.

Turning now to FIG. 16, the main display 26 according to another embodiment is illustrated. In this embodiment, the basic game is a slot machine game having five reels 220, 222, 224, 226, 228. When the five basic game reels 220, 222, 224, 226, 228 stop spinning, if three or more "powerball matrix" symbols 228 are located on a played payline 230, then the game progresses to a bonus game, as illustrated in FIG. 17. In other embodiments, other combinations of the "powerball matrix" or other symbols may trigger the bonus game.

Figure 18:
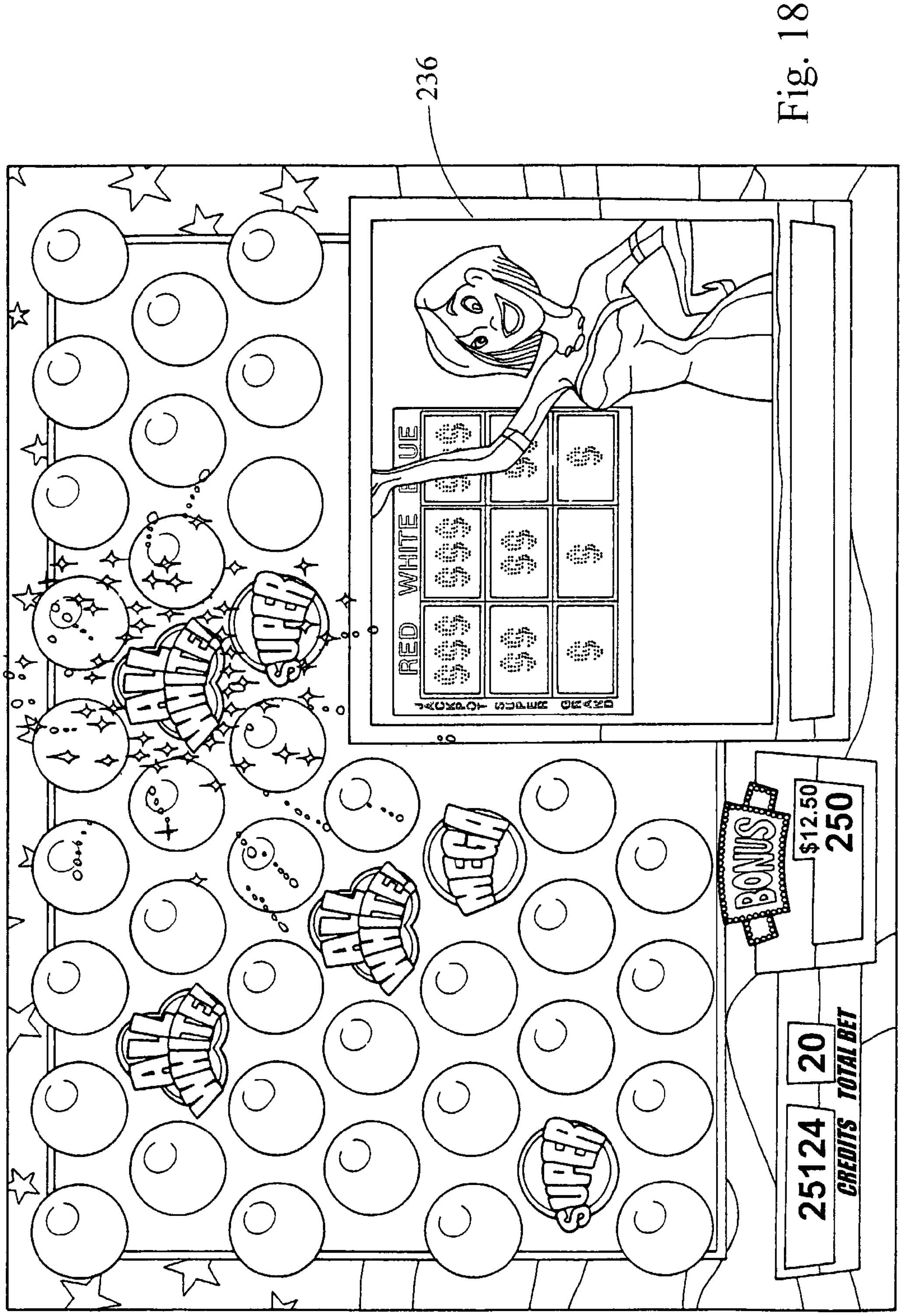
FIG. 18 illustrates a subsequent display of the progressive game of FIG. 17.
Figure 19:
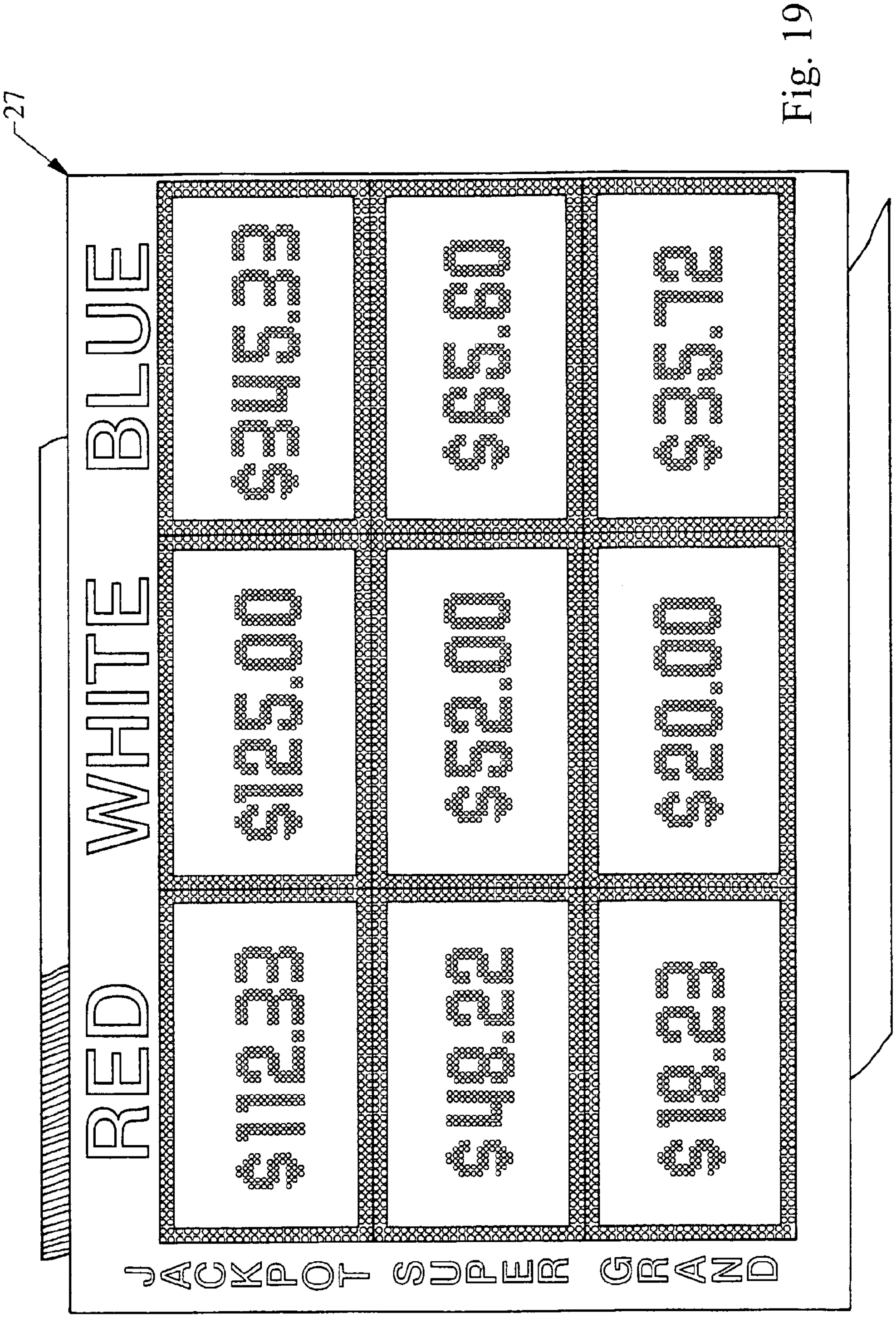
FIG. 19 illustrates a secondary display of a progressive game according to one embodiment of the present invention.

In FIG. 17, the player is shown a number of player-selectable symbols, in this case balls 232, associated with respective progressive symbols. The player is instructed to select the balls 232. As the balls 232 are selected, the associated progressive symbols are revealed to the player. Once the player has revealed three matching progressive symbols (i.e., three of a kind), the player will win the award identified by the matching progressive symbols. As shown in FIG. 18, the player has selected six balls, revealing three balls 234 labeled "all white." The player is then awarded all of the white progressives, shown in FIG. 19. However, the player may not be aware of the amount of each progressive. As shown in FIG. 18, an inset screen 236 illustrates the progressives with only dollar signs representing the relative amounts of the progressives. Hiding the numerical value of the amounts creates player excitement. Alternatively, the amounts of the progressives may be shown on the inset screen 236, a communal display, and/or a secondary display 27 as illustrated in FIG. 19.

Also as shown in FIG. 18, the player has revealed other balls 238. These non-willing balls 238 include a color and a type of progressive. As shown in the inset screen 236, the type of progressive relates to a row in the matrix and the color of the ball corresponds to the column. Some of the balls may correspond to multiple awards.

Figure 20:
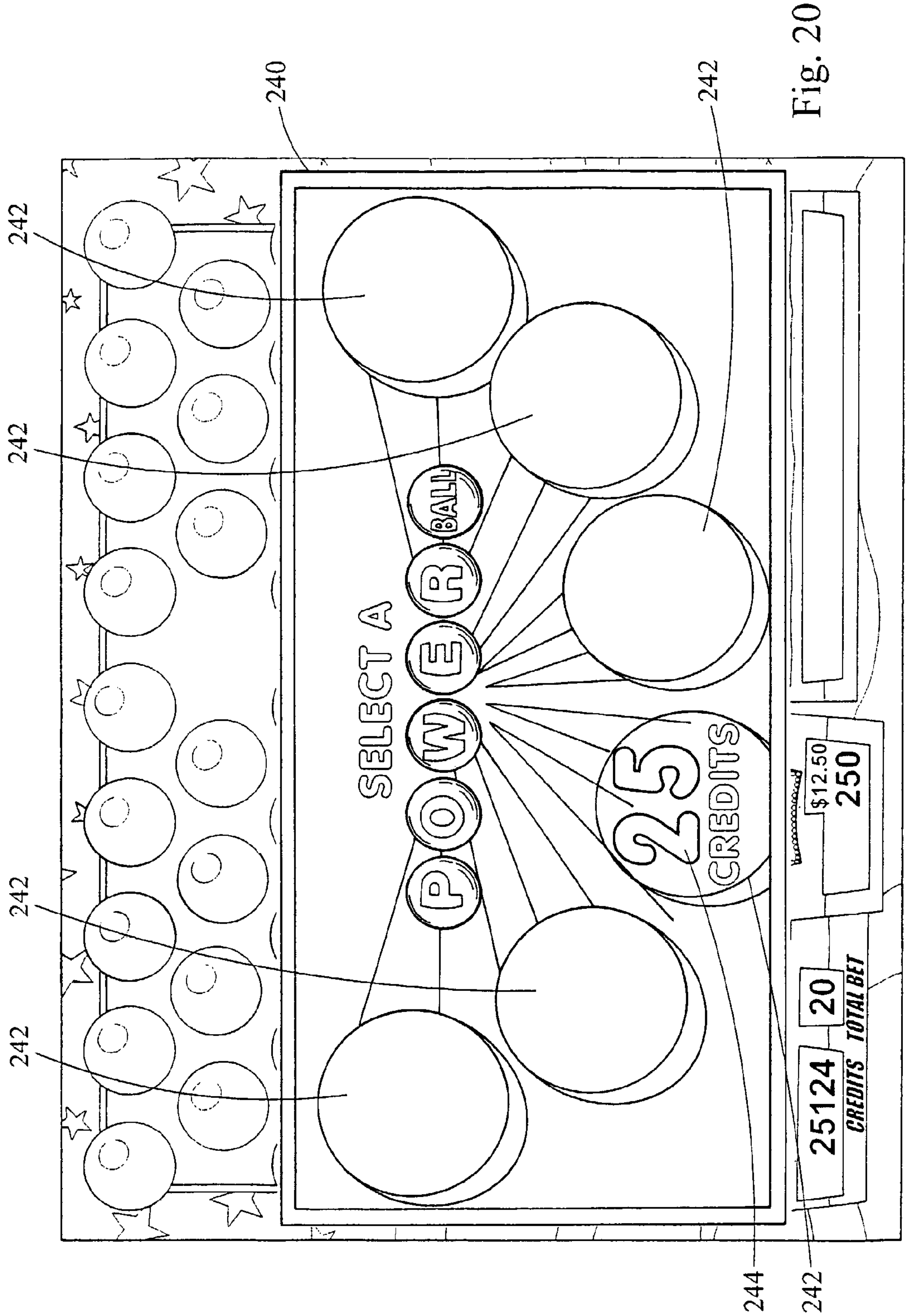
FIG. 20 illustrates a display of a bonus game according to one embodiment of the present invention.

After the player has won the progressive award, a third screen 240 is displayed as shown in FIG. 20. The player is instructed to select one of the balls 242. In this embodiment, the player has selected a ball 244 that results in an additional win of 25 credits. Other wins may include different credit amounts or a "play again" symbol, which allows the player to play the bonus screen again. Other wins may include free spins on the basic game or a multiplier.

Furthermore, while the embodiments in FIGS. 1-8 and 16-20 are all described using video reels and FIGS. 9, 10 and 13-15 are described using mechanical reels, it should be understood that for the purposes of the invention described, the type of reels used are interchangeable.

Furthermore, while the embodiments have been described having a matrix with multiple rows and multiple columns, other patterns are available as well. For example, a dart board pattern having various radial and circumferential locations can be employed. A pyramid may have progressive jackpots stacked in rows with decreasing numbers of jackpots in ascending order, and one large jackpot (e.g., a wide area progressive) at the top of the pyramid. In short, patterns can produce multiple characteristics for identifying which jackpot or jackpots have been achieved.

Other characteristics exist for identifying each jackpot. For example, color, odd/even numbers (looking at one digit of the jackpot value), shapes in which the jackpots are displayed, and various alpha-numeric symbols can be associated with each jackpot. To indicate to the player which jackpot or jackpots has been achieved, the player views on a display indicia corresponding to these characteristics. For example, rather than the symbols of the basic game in FIG. 1 or 8 indicating a row and column (or the reel 160 in FIGS. 9-10 doing the same), the symbols would indicate an "odd" last digit and a "red" color to award all of the progressive jackpots that are displayed in a red color and have an odd (1, 3, 5, 7, or 9) last digit.

Further, it should be noted that while some embodiments have been described with respect to a basic game triggering the progressive jackpot, the bonus or secondary game could be equally employed to perform this task. Furthermore, the determination of whether a player has achieved a progressive jackpot can be conducted by the gaming terminal 10 or by the game network 50. For example, playing a wagering game (basic game or bonus game) may cause the player to be eligible for the progressive jackpots, and the network 50 then determines whether the player has won. The network 50 may determine whether the player has won one or more of the jackpots in "mystery" fashion such that the player is surprised that he or she has won. The network 50 may instruct the gaming terminal 10 of a progressive game outcome, and the gaming terminal 10 may then display symbols indicative of the progressive game outcome or, in the case of a mystery jackpot, the gaming terminal 10 may then award one or more of the progressive jackpots.

While the present invention has been described with reference to one or more particular embodiments, those skilled in the art will recognize that many changes may be made thereto without departing from the spirit and scope of the present invention. For example, progressive jackpots are often displayed on signage that is located proximate to (usually above) the gaming terminals, which can also be done in accordance to the present invention. Each of these embodiments and obvious variations thereof is contemplated as falling within the spirit and scope of the claimed invention, which is set forth in the following claims.

What is claimed is:

1. A method for conducting a progressive wagering game on a gaming machine including a display device and one or more processors, the progressive wagering game including a basic game and a plurality of progressive jackpots, the method comprising:

conducting, via the display device, the basic game including displaying a randomly selected basic game outcome and a matrix containing the plurality of progressive jackpots;

in response to the randomly selected basic game outcome being one of a plurality of basic game winning outcomes, awarding a player, via the one or more processors, a basic game payout amount; and in response to the randomly selected basic game outcome being one of a plurality of progressive-jackpot outcomes, awarding the player, via the one or more processors, at least two of the plurality of progressive jackpots, wherein the at least two of the plurality of progressive jackpots define a first group of progressive jackpots.

2. The method of claim 1, wherein the matrix of displayed progressive jackpots includes multiple rows and columns.

3. The method of claim 2, wherein one of the plurality of progressive jackpot outcomes is a row-winning outcome and the method further comprises awarding the player all of the progressive jackpots in an entire row of the matrix in response to the randomly selected basic game outcome being the row-winning outcome.

4. The method of claim 2, wherein one of the plurality of progressive jackpot outcomes is a column-winning outcome, and the method further comprise awarding the player all of the progressive jackpots in an entire column of the matrix in response to the randomly selected basic game outcome being the column-winning outcome.

5. The method of claim 1, wherein one of the plurality of progressive jackpot outcomes is a win-all outcome, and the method further comprise awarding the player all of the progressive jackpots in response to the randomly selected basic game outcome being the win-all outcome.

6. The method of claim 1, wherein the matrix comprises a plurality of rows and columns, wherein at least one of the rows and columns is color-coded.

7. The method of claim 1, further comprising lighting the progressive jackpots displayed in the matrix during the wagering game in response to corresponding progressive-jackpot outcomes moving across an active payline that indicates a combination of symbols associated with the randomly selected basic game outcome.

8. A gaming system configured to conduct a progressive wagering game including a basic game and a plurality of progressive jackpots, the system comprising:

at least one display device;

one or more processors;

at least one memory device storing instructions that, when executed by the one or more processors, cause the one or more processors to operate with the display device to conduct the basic game including displaying a randomly selected basic game outcome selected from a plurality of outcomes and a matrix containing the plurality of progressive jackpots;

in response to the randomly selected basic game outcome being one of a plurality of basic game winning outcomes, award a player a basic game payout amount; and in response to the randomly selected basic game outcome being one of a plurality of progressive-jackpot outcomes, award the player at least two of the plurality of progressive jackpots.

9. The gaming system of claim 8, wherein the at least one display device includes a first display device to display the basic game and a second display device to display the plurality of progressive jackpots in the matrix.

10. The gaming system of claim 9, wherein the first display comprises a first set of mechanical reels.

11. The gaming system of claim 8, wherein the single event is the randomly selected outcome being a win-progressive award outcome and wherein the plurality of progressive awards are displayed in a matrix, and the randomly selected outcome indicates a row characteristic and a column characteristic for each of the at least two progressive jackpots that are awarded.

12. The gaming system of claim 8, wherein each of the plurality of progressive jackpots includes at least two characteristics associated therewith, the at least two characteristics allowing for an identification as a winning progressive jackpot.

13. The gaming system terminal of claim 12, wherein at least one of the characteristics is selected from the group consisting of orientation within a defined pattern, odd or even numbers, a plurality of colors, a plurality of shapes, and a plurality of alphanumeric.

14. The gaming terminal of claim 12, wherein the at least two characteristics of each of the plurality of progressive jackpots include a row characteristic and a column characteristic within the matrix in which the plurality of progressive jackpots are displayed.

15. The gaming terminal of claim 14, wherein the randomly selected basic game outcome indicates the at least two characteristics identifying the at least two progressive jackpots that are awarded to the player.

16. A gaming system for conducting a progressive wagering game including a basic game and a plurality of progressive jackpots, the plurality of progressive jackpots being displayed in a matrix, the system comprising:

a first reel set having a plurality of symbols that indicate a randomly selected basic game outcome of the wagering game;

a second reel set for displaying symbols corresponding to one or more of the plurality of progressive jackpots; and one or more processors executing instructions that cause the one or more processors to operate with the first and second reel sets to in response to the randomly selected basic game outcome being one of a plurality of basic game winning outcomes, award a player a basic game payout amount; and in response to the randomly selected basic game outcome being one of a plurality of progressive-jackpot outcomes, the second reel set is activated to indicate at least two of the plurality of progressive jackpots to be awarded to the player.

17. The gaming terminal of claim 16, wherein the plurality of progressive jackpots are color-coded and the second reel set includes color codes that indicate the at least two progressive jackpots to be awarded to the player.

18. The gaming terminal of claim 16, wherein the second reel set is one reel and the symbols on the second reel set include symbols corresponding to at least two characteristics for identifying the at least two progressive jackpots to be awarded to the player.

19. The gaming terminal of claim 16, further comprising a secondary display displaying the plurality of progressive jackpots in the matrix.

20. The gaming terminal of claim 19 wherein the second reel set includes a plurality of pay lines, each of the pay lines corresponding to at least one of a row or a column}n the matrix.

* * * * *